Nov. 19, 1957  J. R. PADRICK  2,813,389
CONSTANT ANGLE LIFT TYPE TANDEM HARROW
Filed Dec. 7, 1953  3 Sheets-Sheet 2

Inventor:
John R. Padrick
By Soans, Glaister & Anderson
Attys

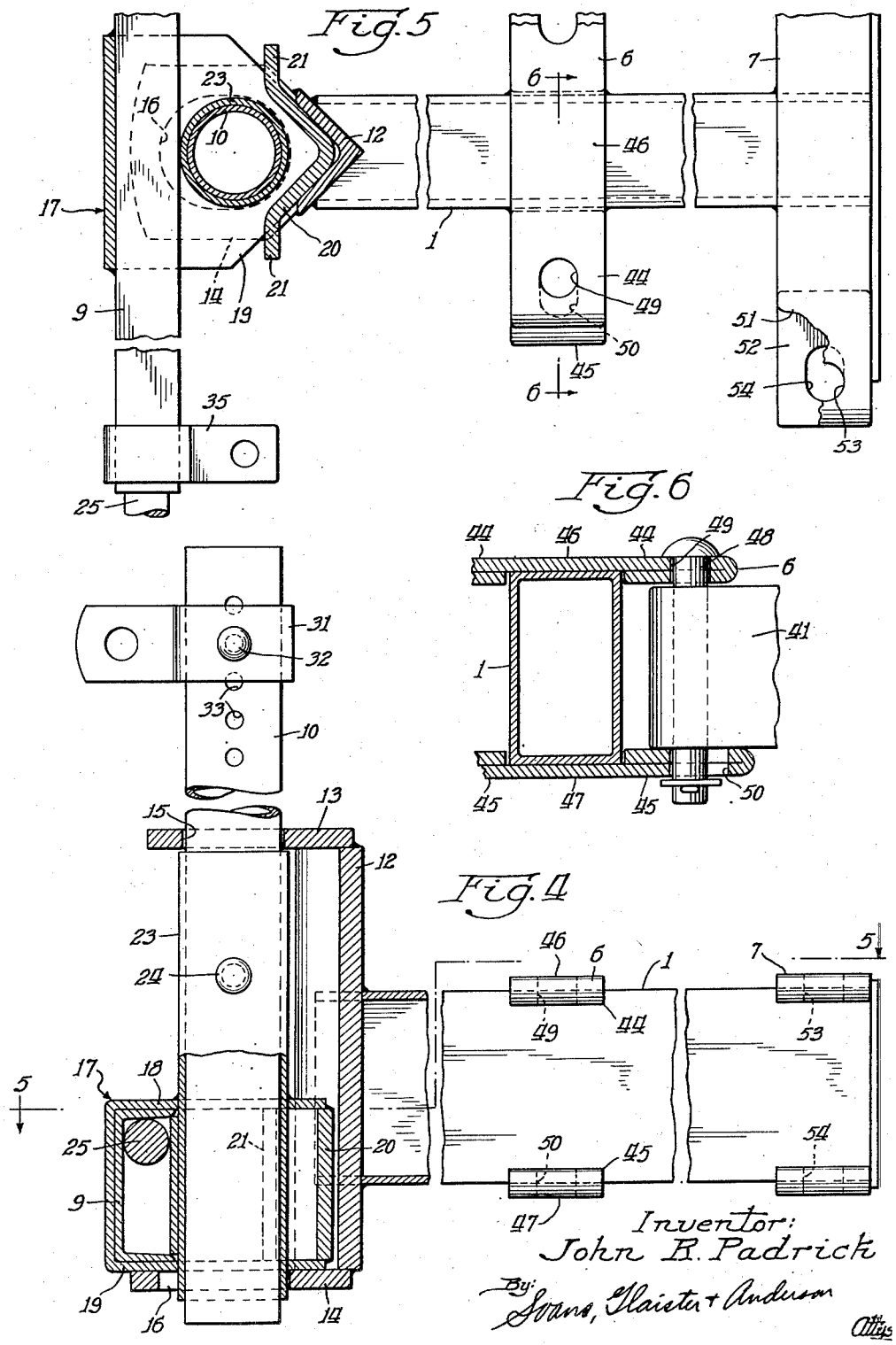

United States Patent Office 2,813,389
Patented Nov. 19, 1957

2,813,389

CONSTANT ANGLE LIFT TYPE TANDEM HARROW

John R. Padrick, Anniston, Ala., assignor to J. I. Case Company, Racine, Wis., a corporation of Wisconsin Application December 7, 1953, Serial No. 396,427

6 Claims. (Cl. 55—83)

This invention relates to a so called constant angle lift type tandem harrow, that is to say, an implement adapted for operation by means of a tractor and in which the earth working discs or other tools are held at substantially constant angles to the line of travel and which implement may be raised and freed from the ground for transportation purposes. By "tandem harrow" is meant the presence of front and rear gangs of harrows, and the words "constant angle" are herein used in a practical sense to refer to the positioning of the tools within a limited range from a predetermined angle and within which range the mode of operation of the implement does not vary significantly.

The main objects of the invention are to provide an improved and simplified harrow structure of the character indicated; to provide an arrangement in which the angle of the earth working discs or other tools will be held substantially constant notwithstanding a permissible degree of side to side shifting of the harrow structure; to provide a tandem harrow of the character indicated which may be raised from the ground for transportation purposes and which will automatically be locked in centered position behind the tractor when the harrow is so raised; to provide a relatively simple, clean cut structure which will be easy to maintain and keep clean and in good working order; and in general it is the object of the present invention to provide an improved harrow structure of the character indicated.

Other objects and advantages of the invention will be understood by reference to the following specification and accompanying drawings (3 sheets) wherein there is described and illustrated a constant angle lift type tandem harrow embodying a selected form of the invention.

In the drawings:

Fig. 4 is a vertical cross-section on the line 4—4 of Fig. 1;

Fig. 5 is a plan section on the line 5—5 of Fig. 4; and

Fig. 6 is a fragmentary cross-section on the line 6—6 of Fig. 5.

Figure 1:
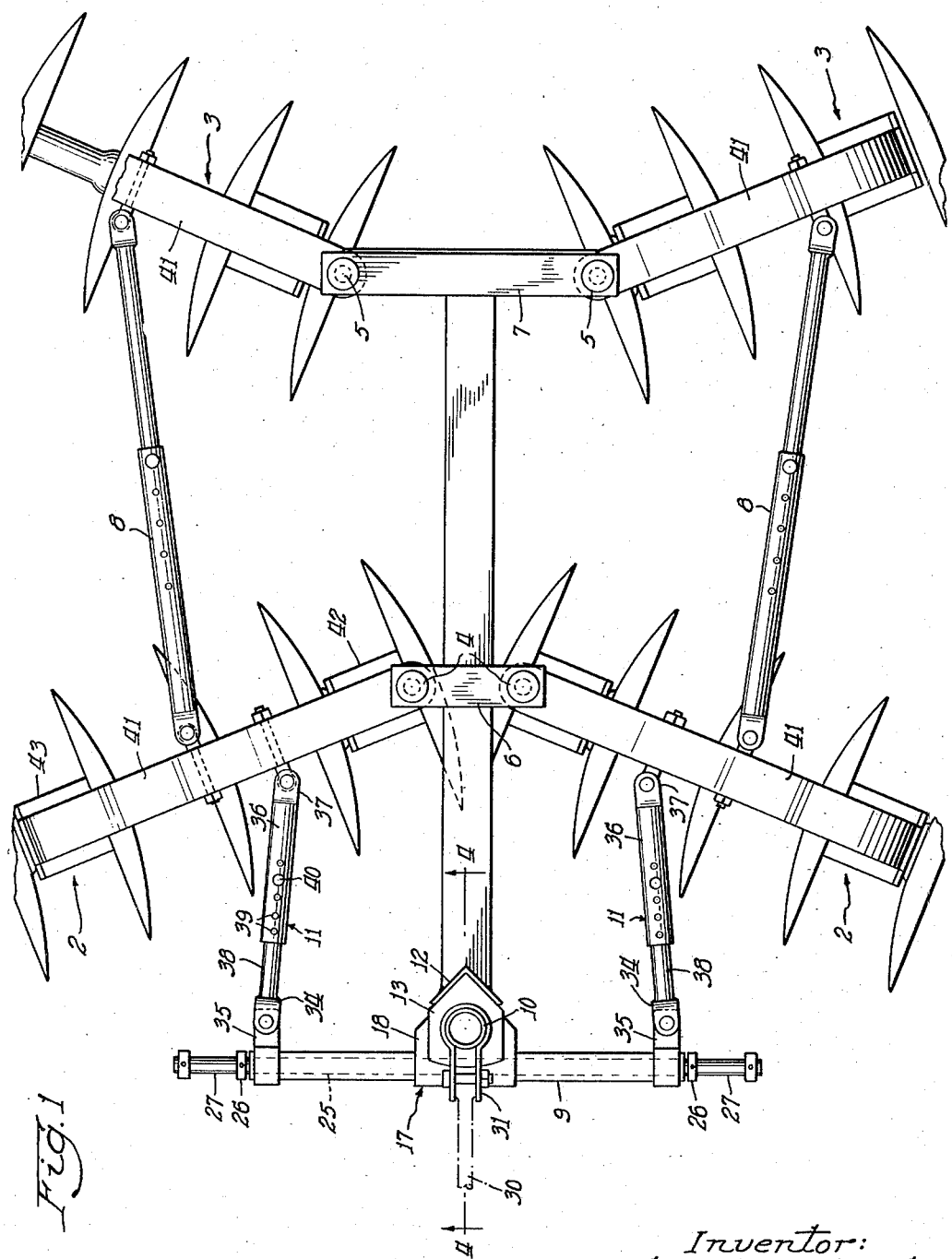
Fig. 1 is a plan.

The harrow structure shown in this instance comprises a longitudinally extending main frame member 1, front and rear pairs 2 and 3 of disc harrow gangs pivotally connected as indicated at 4 and 5 respectively to suitable cross arm structures 6 and 7 carried by the main frame 1 at suitable intervals along the length thereof. The harrow gangs 2 and 3 at each side of the main frame are interconnected by means of a link 8 which is constructed so as to be adjustable as to its length to permit adjustment of the angular relationship of the pairs of harrow gangs on each side of the frame 1.

At the front of the implement, there is a pull bar 9 and a mast 10 which are adapted to be connected as will presently be explained to a tractor for pulling the implement and in such a manner that the implement may be raised out of the ground for transportation purposes. The front harrow gangs 2 are connected by suitable links such as indicated at 11 to the pull bar 9 to thereby hold the respective front harrow gangs in the desired angular relationship to the frame 1.

Figure 3:
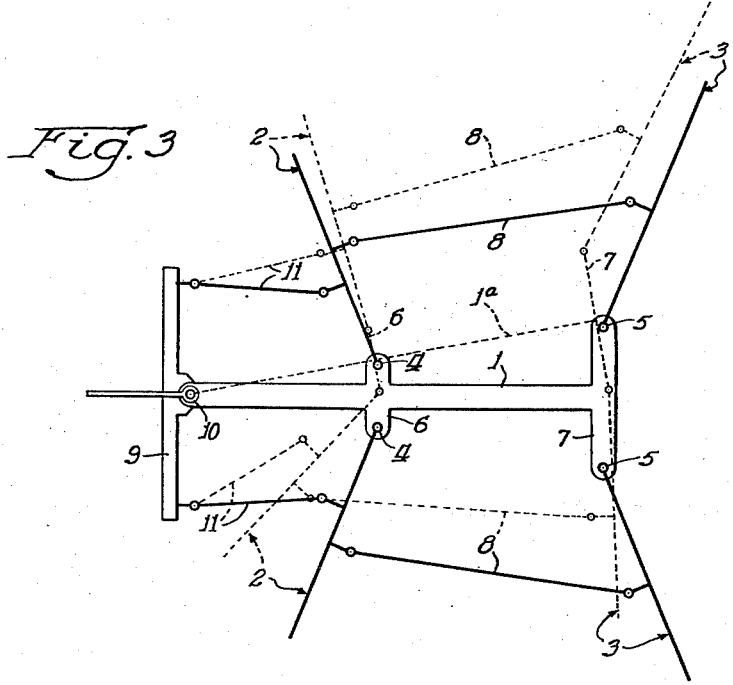
Fig. 3 is a diagrammatic illustration of the means whereby constant angularity is maintained notwithstanding side to side shifting of the harrow structure.

The described mounting of the harrow gangs, the link connections thereof to each other and to the pull bar 9 are operative to maintain the harrow gangs in substantially fixed angular relationship throughout a substantial range of lateral swinging movement of the frame 1 about the mast 10 which constitutes a pivot about which the frame 1 may rock horizontally. As represented in Fig. 3, if the frame member 1 swings to the right of the line of draft (with reference to the line of draft of the implement when looking forwardly thereof from the rear of the implement) to a position such as represented at 1a, the links 11 and 8 at the right hand side of the frame 1 will act as struts to swing the harrow gangs 2 and 3 rearwardly about their pivots 4 and 5 while the links 11 and 8 at the left hand side of the frame will act as tension members to cause the left hand harrow gangs 2 and 3 to swing forwardly about their respective pivots 4 and 5. In this way the angular disposition of the harrow gangs relative to the line of draft is maintained substantially constant for practical purposes. When the frame 1 swings to the left of the line of draft about its pivot 10, the link action will, of course, be reversed to accomplish the same purpose. This constant angular relationship is of considerable benefit in that it provides for substantially constant working load and constant ground working action. To the extent that there is a change in the angular disposition of the discs of the harrow gangs, it is a compensating change or adjustment because, when the angle of the front discs to the line of draft is reduced, the angle of the rear discs to the line of draft is increased and vice versa. The frame 1 is normally caused to swing to the left and to the right by irregularities in the ground and it is desirable that at least a limited range of such swinging movement be freely permitted in order to avoid the production of excessive strains in the structure.

When the harrow structure is raised out of the ground for transportation purposes, it is important as a safety measure, that the frame 1 with its harrow gangs be held against side to side shifting about the axis of the post or mast 10. To that end the following described structure is provided.

At the front end of the frame member 1 there is rigidly mounted a vertically extending angle iron element 12, the same being seated in an appropriately shaped notch cut in the end of the frame member 1 to which it is welded as indicated or otherwise suitably secured. The upper and lower ends of the angle iron member 12 are provided with cap plates 13 and 14 which are respectively welded or otherwise secured to said member 12. The upper member 13 is provided with a circular opening 15 and the lower member 14 with an elongated opening 16, this opening being elongated in the direction of the length of the frame 1 for a purpose which will presently appear.

The pull bar is illustrated as being of rectangular tubular cross-section and it is provided adjacent the post 10 with a U-shaped member 17 having upper and lower legs 18 and 19 which embrace the pull bar 9 and extend rearwardly therefrom. This U-shaped member is rigidly secured to the pull bar 9 as by welding and at its rear end is equipped with a rearwardly facing V-shaped plate 20 or indexing finger, this V-shaped plate being fitted between the legs 18 and 19 of the U-shaped member and welded thereto. This V-shaped member is preferably provided with outwardly extending side flanges 21.

The legs 18 and 19 of the U-shaped member are provided, intermediate the pull bar 9 and the indexing finger 20, with openings through which a tube 23 is passed, this tube projecting a short distance below the pull bar 9 and a greater distance above the same. The projecting lower end of the tube 23 fits in the slot 16 so as to be movable forwardly and rearwardly therein and the upper end of said tubular member 23 is disposed adjacent the lower face of the upper end member 13 of the main frame structure. The post 10 fits slidably through the tube 23 and is locked in selected position relative thereto by passing a suitable pin 24 diametrically through the tube 23 and post 10.

The post 10 is a free fit in the opening 15 so that the tube 23 and post 10 may rock forwardly and rearwardly at their lower end, the tube 23 moving in the slot 16 while the post 10 pivots slightly within the opening 15. Vertical displacement of the post 10 and tube 23 is prevented by engagement of the upper end of the tube 23 with the underside of the fixed top plate 13 and seating of the lower leg 19 of the U-shaped member 17 on the upper face of the fixed lower plate 14.

A rod 25 extends horizontally through the hollow pull bar 9 and is locked against endwise displacement therefrom by means of suitable collars such as indicated at 26 (Fig. 1) which are pinned to the rod. Extended end portions 27 of the rod are provided for receiving draw bar arms such as indicated at 28 (Fig. 2) by which the harrow is connected to the tractor and by which said pull bar is constantly held in substantially fixed angular relationship to the line of draft. The draw bar arms 28 are also provided with connections indicated at 29 whereby lifting or force is applied from power operated mechanism forming part of the tractor, to raise the harrow structure. Also for facilitating raising and lowering of the harrow structure, the upper end of the post 10 is connected by means of a link 30 to another part of the tractor, said link acting in co-operation with the draw bars 28, in the nature of parallel link mechanism to raise the harrow structure in its entirety while maintaining said structure in a more or less horizontal plane.

When the harrow is elevated, its weight will cause the vertical front member 12 of its main frame to rock forwardly at its lower end about the bearing area of the opening 15 at the upper end of said member 12 so that the lower portion of the vertical angle member 12 will bear against the indexing member 20 as shown in Fig. 5 to prevent rocking of the main force structure about the pivot post 10. If the main frame is not centered or aligned with the line of draft when raising of the frame is started, one of the angularly disposed sides of the indexing finger 20 will engage one of the angularly disposed sides of the vertical angle iron member 12 of the main frame to cam the main frame 1 with its harrow gangs to substantially centered position in which it will be locked as above explained.

When the harrow structure is lowered into ground working position, it will rock upwardly about the bearing area of the opening 15 so that the lower portion of the tube or sleeve 23 will be positioned in the forward portion of the slot 16 and the indexing finger will be spaced forwardly from the V-shaped member 12 so as to permit relatively free horizontal rocking of the main frame structure 1 about the axis of the mast or post 10. Such rocking will, however, be limited by engagement of the edges of the member 12 with one or the other of the side flanges 21 of the indexing member 20. In the drawings, the bar or rod 25 is shown in the position relative to the pull bar 9 occupied when the harrow is raised out of the ground. In the ground working posittion of the structure, the bar or rod 25 will normally be disposed in a lower position relative to said pull bar 9 to permit the harrow to enter the ground to whatever extent is permitted by the setting of the tractor disc gangs.

Figure 2:
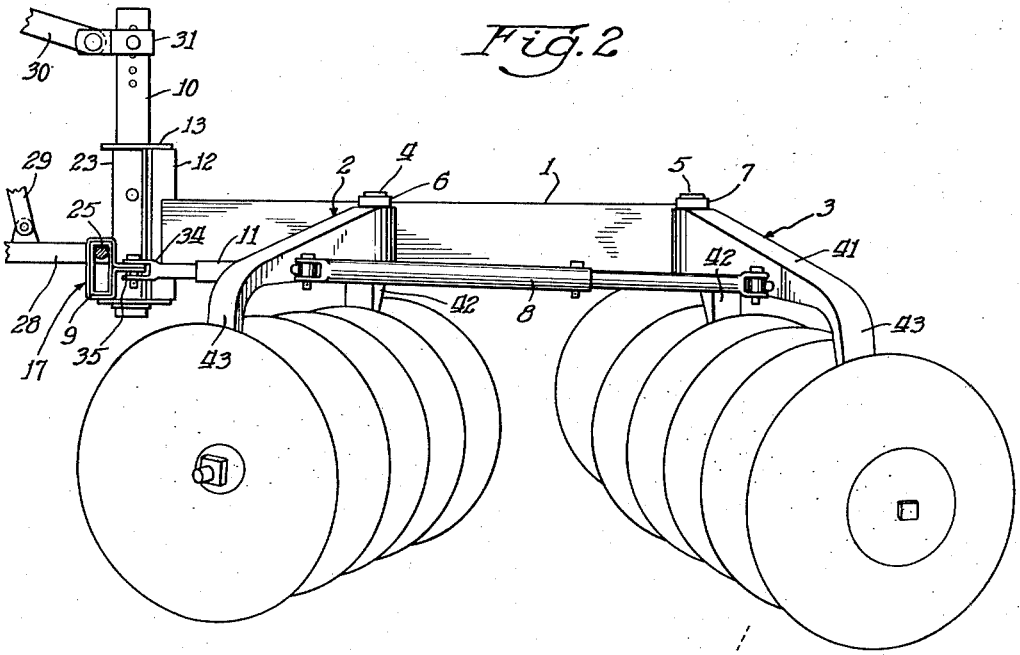
Fig. 2 is a side elevation.

The mast 10 is provided near its upper end with a suitably formed clevis 31 which may be locked by a cross pin 32 in selected position on the mast, said clevis being adapted to receive the connection to the draw bar link 30 as shown in Fig. 2. The mast is preferably provided with a series of vertically spaced holes 33 in its upper end portion to permit selective positioning of the clevis 31 at the desired height to obtain the desired lifting action on the harrow.

For facilitating connection of the links 11 to the pull bar 9, suitable lugs are provided to fit in the clevis end members 34 of the links 11, these lugs being indicated at 35 and formed of suitable lengths of strap metal bent to fit around the pull bar and to provide rearwardly extending face to face, lug-forming parts adjacent their ends as shown, and welded or otherwise secured in fixed position thereon as desired. The adjacent links 11 may be of two part construction including a tubular section 36 which is provided at one end with a clevis structure 37 for embracing a lug secured to the harrow gang frame 2, and a rod like element 38 which extends from the clevis 34 and fits slidably within the tubular element 36. Near one end, the link element 38 is provided with a hole which may be registered with any one of a series of holes 39 in the link element 36 to receive a fastening pin 40 which will determine the effective length of the link. Each of the links 8 and 11 may be similarly constructed.

Each of the harrow gangs is supported by an arm 41 which is pivoted as already mentioned at 4 or 5 to one of the cross arms 6 and 7 of the main frame member 1. This harrow frame member 41 is provided with downwardly extending legs 42 and 43 as best shown in Fig. 2 for supporting the shaft which carries the discs, the details of this mounting being of no concern in respect of the present invention. The pivot mounting of the harrow frames 41 is preferably as shown in Fig. 6, the cross arms being so formed as to provide upper and lower legs 44 and 45 projecting beyond the sides of the frame member 1, these legs being provided, in this instance, by rebent end portions of cross straps 46 and 47 respectively. The cross straps 46 and 47 are welded or otherwise fixedly secured to the frame member 1 which may be fabricated from a pair of channel iron members or otherwise. The harrow frame member 41 has an end portion which fits between the upper and lower pivot mounting legs 44 and 45 and a pivot pin 48 is passed through suitable openings in the legs 44 and 45 and in the frame member 41. The opening 49 in the upper leg is of such size as to freely rotatably receive the pin 48 and the opening 50 in the lower leg is elongated as shown so that the lower portion of the pivot pin 48 may rock inwardly and downwardly of the frame 1 so as to permit a predetermined amount of vertical play of the gang of harrow discs without corresponding movement of the main frame member 1. The rear cross arm structure 7 is similar to the front cross arm structure and embodies upper and lower cross arms 51 and 52 (Fig. 5), the upper arm being provided with a round pivot pin hole 53 and the lower arm 52 being provided with an elongated pivot pin hole 54. The hole 54 in the lower leg of each rear cross arm is extended inwardly beyond the upper arm pivot hole 53, whereas in the front cross arm structure the elongated pivot pin hole 50 is extended out beyond the upper arm pivot hole 49. This arrangement permits the front and rear harrow gangs to assume slightly inclined positions relative to each other, the inclination being opposite with reference to a horizontal plane so that a slightly better earth working action is obtained from the discs. Nevertheless, in both arrangements, the disc gangs are permitted to rock vertically to a limited extent for free action relative to the main frame structure.

The front links 11 are connected at their front ends to the adjacent end portions of the pull bar 9 and at their rear ends to the front harrow gangs at such points that said links 11 will be disposed in nearly parallel relation to the main frame 1 when the harrow gangs are disposed in normal symmetrical relationship to the main frame member 1. The links 8 are interconnected to the front and rear harrow gangs on each side of the frame 1 with the link pivots at substantially like distances from the respective pivot connections 4 and 5 of the disc gangs to the main frame structure. This relationship has been found to be highly satisfactory but not critical and it may be varied within fairly wide limits. All of the harrow gangs may be of substantial like construction and like size. In order to offset the position of the discs of the rear harrow gangs relative to the position of the discs of the front harrow gangs with reference to the line of draft, the rear cross arms 7 are made somewhat longer than the front cross arms 6 and the pivots 5 for the rear disc gangs are spaced outwardly from the longitudinal center line of the main frame 1 a greater distance than are the pivots 4 of the front gangs. The difference in this distance is, of course, selected to attain the desired staggered relationship of the front and rear harrow discs.

I claim:

1. In a harrow, the combination of a pull bar which extends transversely of the line of draft of the harrow and which is adapted to be connected to a tractor in such a manner as to be constantly held in fixed relation to said line of draft, a main frame member horizontally swingably connected to and extending rearwardly from the central portion of the length of said pull bar, front and rear harrow gangs extending laterally from each side of said main frame member and horizontally swingably connected thereto, links connecting the front harrow gangs to said pull bar, the connections of said links to said front harrow gangs and to said pull bar being spaced laterally a substantial distance from said main frame, and links interconnecting said front and rear harrow gangs on each side of and in laterally spaced relation to said main frame, said link connections being operative to maintain said harrow gangs in approximately constant angular relation to said line of draft notwithstanding swinging of said main frame member to either side of said line of draft.

2. In a harrow, the combination of a pull bar adapted to be connected to a tractor for draft and lift purposes and in such a manner as to be constantly held in fixed relation to a line of draft, said pull bar being elongated transversely of said line of draft, a main frame member horizontally swingably connected to and extending rearwardly from a central portion of said pull bar, substantially like front and rear harrow gangs extending laterally from each side of said main frame member and horizontally swingably connected thereto, links approximately paralleling said main frame and connecting the front harrow gangs to said pull bar, and links interconnecting said front and rear harrow gangs on each side of said main frame, the last mentioned links being connected to said front and rear harrow gangs at substantially like distance from their respective connections to said main frame, and said rear harrow gangs being connected to said main frame at greater distances from the longitudinal center thereof than are said front harrow gangs to thereby stagger the earth working elements of the rear gangs relative to those of the front gangs, said link connections being operative to maintain said harrow gangs in approximately constant angular relation to said line of draft notwithstanding swinging of said main frame member to either side thereof.

3. In a harrow, the combination of a pull bar adapted to be connected to a tractor for draft and lift purposes and in such a manner as to be constantly held in fixed relation to a line of draft, a frame extending rearwardly from said pull bar and connected thereto for vertical movement therewith and horizontal swinging movement relative thereto, a harrow gang secured to said frame so as to be movable therewith horizontally and also vertically for raising and lowering movement from and to the ground, and means for locking said frame against horizontal swinging movement when said harrow gang is raised to clear the ground, said means comprising a member secured to the front end of said frame and having forwardly horizontally diverging sides and upper and lower horizontal end plates, a pivot post rigid with said pull bar and journalled in said end plates, an indexing finger rigid with said post and pull bar and engageable with the adjacent faces of said diverging sides to lock said frame against horizontal shifting about the axis of said pivot post, one of said end plates having a journal opening elongated in the direction of the line of draft for receiving one end of said post and permitting restricted forward and rearward shifting thereof to effect disengagement of said indexing finger from said diverging end plates when said harrow gang engages the ground, thereby to release said frame and harrow gang for said horizontal shifting movement.

4. In a harrow, the combination of a pull bar adapted to be connected to a tractor for draft and lift purposes and in such a manner as to be constantly held in fixed relation to a line of draft, a frame extending rearwardly from said pull bar and connected thereto for vertical movement therewith and horizontal swinging movement relative thereto, a harrow gang secured to said frame so as to be movable therewith horizontally and also vertically for raising and lowering movement from and to the ground, and means for locking said frame against horizontal swinging movement when said harrow gang is raised to clear the ground, said means comprising a vertically extending angle member secured to the front end of said frame with the legs of said angle member diverging forwardly, upper and lower bearing plates rigid with said vertically extending member and having pivot openings therein, a pivot post rigid with said pull bar and journalled in said pivot openings, an indexing finger rigid with said post and pull bar and engageable with the adjacent faces of said diverging angle member legs to lock said frame against horizontal swinging movement about said pivot post, the pivot opening in said upper bearing plate being of a size to freely rotatably receive a portion of said post and the pivot opening in said lower bearing plate being elongated in the direction of the line of draft so as to permit restricted forward and rearward shifting of the lower portion of the post in said elongated bearing opening, whereby, when said pull bar is raised to elevate the harrow gang, the weight of said harrow gang will cause said vertically extending angle member to rock relative to the post so as to cause said indexing finger to engage the diverging sides of said angle member to lock said frame against horizontal swinging movement relative to said pull bar, and whereby, when said pull bar is lowered to engage the harrow gang with the ground, said indexing finger will be withdrawn from said locking engagement.

5. In a harrow, the combination of a pull bar adapted to be connected to a tractor in such a manner as to be constantly held in fixed relation to the normal line of draft, a main frame member horizontally swingably connected to and extending rearwardly from said pull bar, front and rear harrow gangs extending laterally from each side of said frame member and horizontally swingably connected thereto, said front and rear harrow gangs respectively being disposed at forward and rearward diverging angles relative to said main frame member, links connecting the front harrow gangs to said pull bar, the connections of said links to said front harrow gangs and to said pull bar being spaced laterally a substantial distance from said main frame, and links interconnecting said front and rear harrow gangs on each side of and in laterally spaced relation to said main frame, said link connections being operative, an an incident to horizontal swinging movement of said main frame, to effect compensating adjustment of the interconnected front and rear harrow gangs so as to maintain substantially constant working load in all positions of said main frame.

6. In an agricultural implement, a member adapted to be connected to a tractor for draft and lift by the tractor and in such a manner as to be normally held in fixed relation to a line of draft, a ground working tool supporting frame extending rearwardly from said member, axially vertical pivot post and vertically forked bracket means interconnecting said member and frame for unitary vertical movement and for relative horizontal and vertical swinging movement of said frame and member, said pivot post and forked bracket connection embodying means whereby, when said member and frame are elevated, said frame is permitted to swing vertically relative to said member and said post and forked bracket are adjusted laterally relative to each other, and interlocking means associated with said post and bracket respectively and engageable as an incident to said lateral adjustment to lock said frame against horizontal swinging movement relative to said member.

References Cited in the file of this patent

UNITED STATES PATENTS

| | | |
|---|---|---|
| 1,104,748 | Waterman | July 21, 1914 |
| 1,223,145 | Cameron | Apr. 17, 1917 |
| 1,449,584 | Butler | Mar. 27, 1923 |
| 2,143,193 | Goble | Jan. 10, 1939 |
| 2,247,534 | Von Schlegell | July 1, 1941 |
| 2,266,590 | Dyer | Dec. 10, 1941 |
| 2,336,410 | McKay | Dec. 7, 1943 |
| 2,601,640 | Simmons | June 24, 1952 |
| 2,710,569 | Altgelt | June 14, 1955 |

FOREIGN PATENTS

| | | |
|---|---|---|
| 319,500 | Great Britain | Sept. 26, 1929 |